(12) United States Patent
Rieker

(10) Patent No.: US 6,230,273 B1
(45) Date of Patent: May 8, 2001

(54) HARDWARE AND SOFTWARE CONTROLLED ON/OFF CIRCUIT FOR COMPUTERS

(75) Inventor: David A. Rieker, Columbus, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 08/103,648

(22) Filed: Aug. 9, 1993

(51) Int. Cl.[7] ........................................................ G06F 1/26
(52) U.S. Cl. ............................................. 713/300; 713/260
(58) Field of Search .................................. 395/750, 575; 364/200, 188, 141

(56) References Cited

U.S. PATENT DOCUMENTS

| | | | | |
|---|---|---|---|---|
| 4,312,035 | * | 1/1982 | Greene ................................ | 364/200 |
| 4,635,195 | * | 1/1987 | Jeppesen, III et al. ............. | 395/750 |
| 4,654,821 | * | 3/1987 | Lapp ................................... | 395/750 |
| 4,668,878 | * | 5/1987 | Wyss ................................... | 364/141 |
| 4,791,453 | * | 12/1988 | Koseki et al. ...................... | 364/188 |
| 4,868,832 | * | 9/1989 | Mavington et al. ................ | 395/750 |
| 5,339,446 | * | 8/1994 | Yamasaki et al. .................. | 395/750 |

\* cited by examiner

Primary Examiner—David A. Wiley
(74) Attorney, Agent, or Firm—Paul W. Martin

(57) ABSTRACT

A hardware and software controlled on/off circuit for computers is provided. The on/off circuit comprises a control circuit which produces first and second signals, wherein the first signal causes the computer to execute a software program which prepares the computer for power removal and which returns a third signal to the circuit when the software program has prepared the computer for power removal, and wherein the circuit produces the second signal to disconnect the power supply in response to the third signal. If for some reason the software program should "lock-up" the computer, the on/off circuit and provides the second signal to disconnect the power supply if the software program has not sent the third signal after a predetermined time from when the control circuit sent the first signal to the software program so that the computer may be shut down.

24 Claims, 2 Drawing Sheets

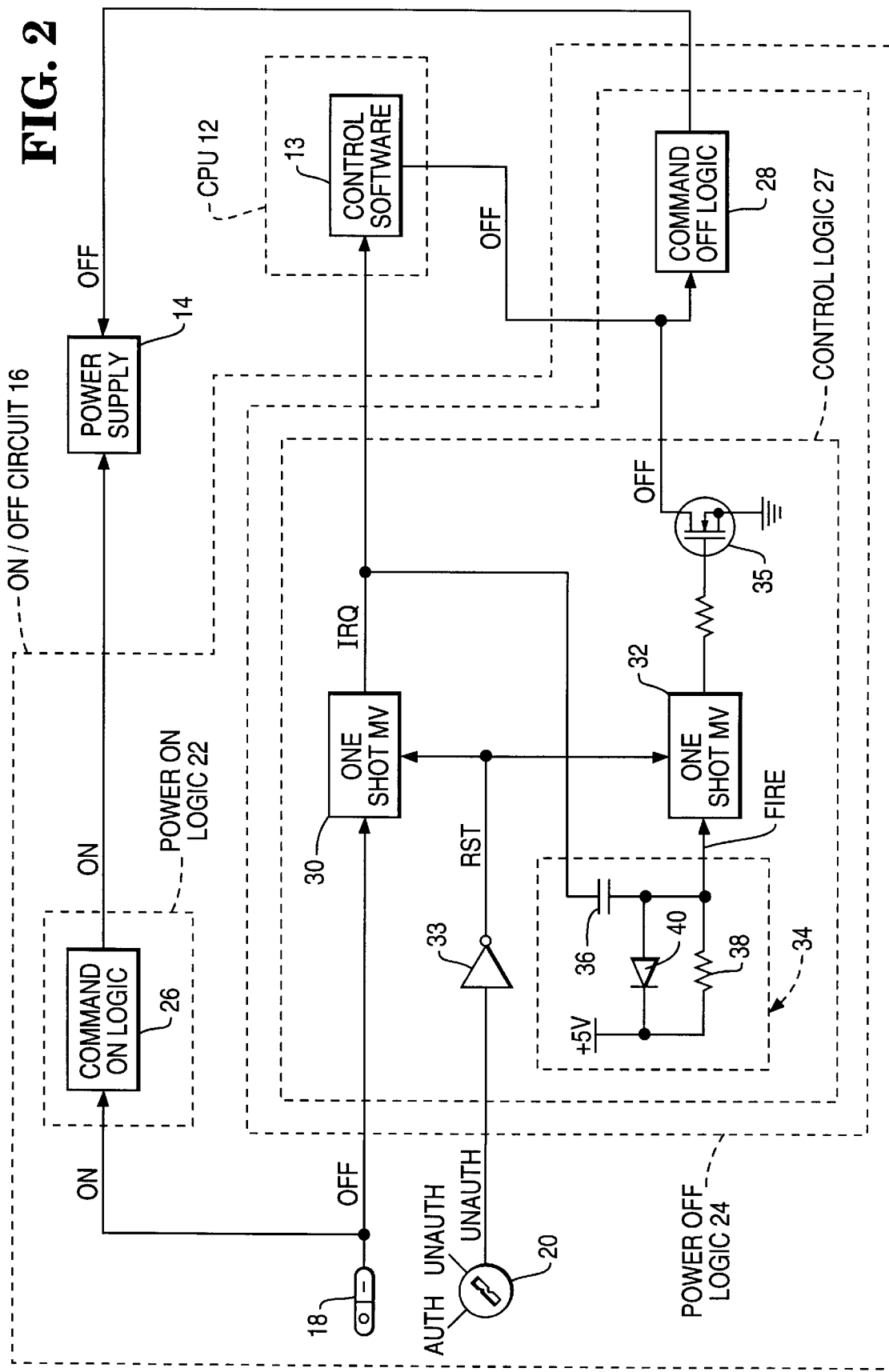

HARDWARE AND SOFTWARE CONTROLLED ON/OFF CIRCUIT FOR COMPUTERS

BACKGROUND OF THE INVENTION

The present invention relates to computers and circuits for turning computers on and off, and more specifically to a hardware and software controlled on/off circuit for computers.

Security of computers, especially retail point-of-service (POS) terminals is of utmost importance to the end user of the product. To that end, it would be highly undesirable to a retailer if power to the terminal were accidentally (or intentionally) removed. A complete shutdown of the terminal would result in a loss of transaction data. The terminal would have to be re-booted and the entire program contents of the terminal would have to be reloaded, jobs which necessarily consume a great deal of time.

Therefore, it would be desirable to provide a hardware and software controlled on/off circuit for a computer requiring security, such as a retail terminal. It would also be desirable for the on/off circuit to provide "fail-safe" hardware control over power removal, while providing a topology wherein the resident terminal software plays an intervening role in the power removal process.

SUMMARY OF THE INVENTION

In accordance with the teachings of the present invention, a hardware and software controlled on/off circuit for computers is provided. The on/off circuit comprises a control circuit which produces first and second signals, wherein the first signal causes the computer to execute a software program which prepares the computer for power removal and which returns a third signal to the circuit when the software program has prepared the computer for power removal, and wherein the circuit produces the second signal to disconnect the power supply in response to the third signal.

If for some reason the software program should "lock-up" the computer, the on/off circuit and provides the second signal to disconnect the power supply if the software program has not sent the third signal after a predetermined time from when the control circuit sent the first signal to the software program so that the computer may be shut down.

The on/off circuit also includes a power switch having on and off positions, and a key switch having authorized and unauthorized positions, wherein both switches provide input signals to the control circuit. The control circuit produces the first signal only if the power switch is in the off position and the key switch is in the authorized position.

The power supply preferably includes a logic on/off power supply and the control circuit includes a one-shot multivibrator coupled to the computer, the power switch, and the key switch. The key switch produces a reset signal for resetting the one-shot multivibrator when the key switch is in the unauthorized position. The one-shot multivibrator produces the first signal in response to the off signal from the power switch when the key switch is in the authorized position. The control circuit also includes a logic off command circuit coupled to the computer which produces the second signal, which is a logic off command signal.

The fail-safe feature of the control circuit is provided by a timer and an additional one-shot multivibrator. The timer circuit is coupled to the first one-shot multivibrator and times a predetermined time period from receipt of the first signal to allow the software program to disconnect the power supply. If the software program is malfunctioning, the additional one-shot multivibrator produces a safety signal which signals the logic off command circuit to disconnect the power supply, thus allowing the computer to be shut down.

It is accordingly an object of the present invention to provide a hardware and software controlled on/off circuit for computers.

It is another object of the present invention to provide a hardware and software controlled on/off circuit for computers which has a hardware fail-safe circuit for allowing the computer to be shut down if the software fails.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a schematic diagram of the on/off circuit of the present invention.

DETAILED DESCRIPTION OF THE THE PREFERRED EMBODIMENT

Figure 1:
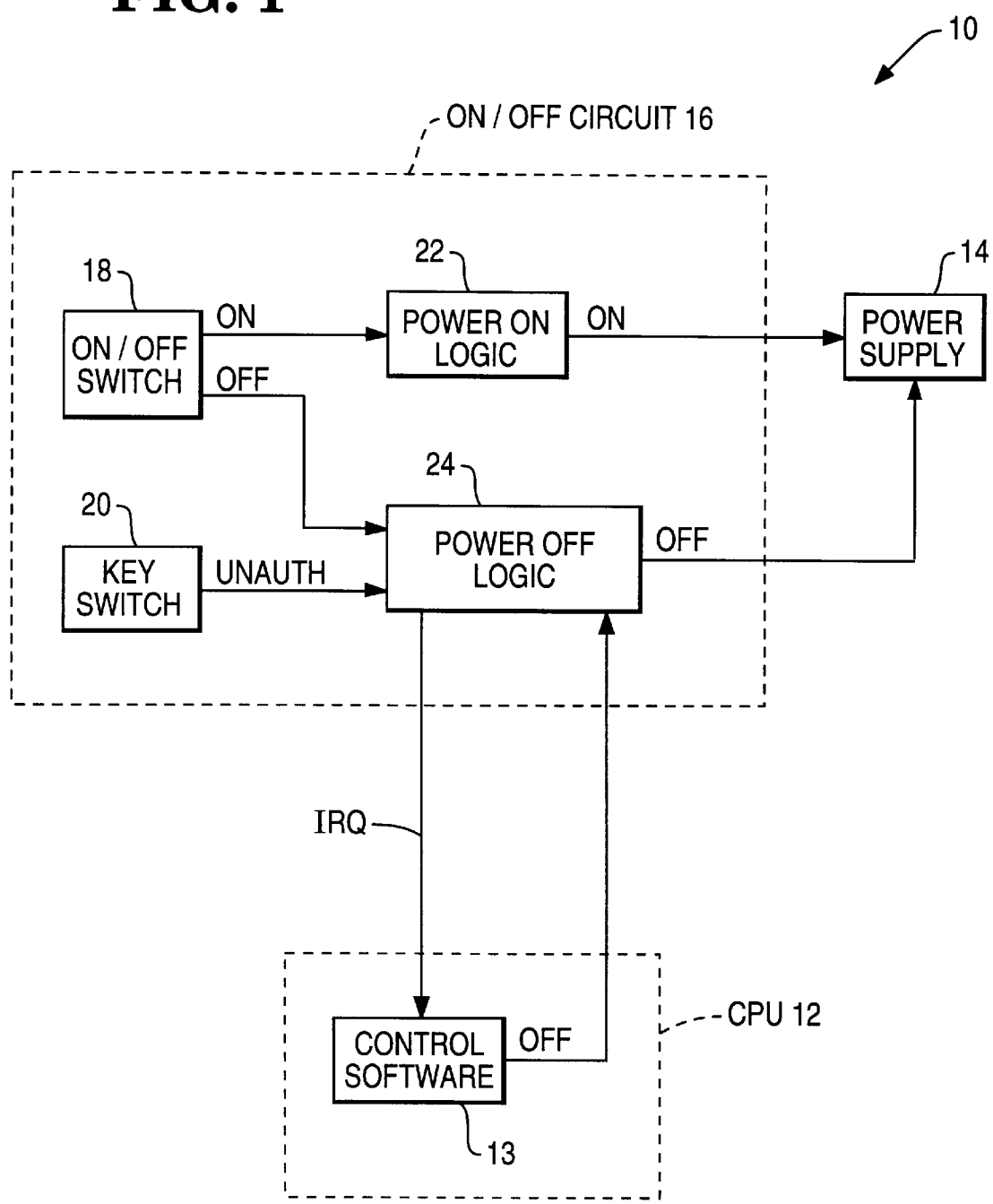
FIG. 1 is a block diagram of a computer system employing the hardware and software controlled on/off circuit of the present invention.

Referring now to FIG. 1, computer system 10 includes central processing unit 12, power supply 14, and on/off circuit 16.

Central processing unit (CPU) 12 executes control software 13 which partially controls the power removal process.

Power supply 14 provides power to all of the components of system 10. Preferably, power supply 14 is any commercially available logic on/off power supply, one which turns on and off by means of hardware commands fed from power on logic 22 and power off logic 24.

On/off circuit 16 provides hardware and software control over the power removal process when the user of system 10 does not intend that power be removed from system 10.

On/off circuit 16 includes on/off switch 18, key switch 20, power on logic 22, and power off logic 24.

On/off switch 18 provides signals ON and OFF for turning on and turning off power. Signal ON couples to power supply 14 through power on logic 22 and power off logic 24. On/off switch 18 is typically a push-button switch located in the front of the cabinet containing system 10.

Key switch 20 is a key switch having "authorized" and "unauthorized" positions. Key switch 20 provides no signal in the "authorized" position. During normal operation, key switch 20 is in the "unauthorized" position, which generates unauthorized signal UNAUTH preventing power removal. It is envisioned that a person of supervisory authority would typically have control over the key for placing key switch 20 in the "authorized" position when controlled power removal is necessary.

Power on logic 22 turns on power from power supply 14 in response to signal ON from on/off switch 18.

Power off logic 24 turns off power from power supply 14 in conjunction with control software 13 in response to an OFF signal from on/off switch 18 and a lack of an UNAUTH signal from key switch 20. Power off logic 24 causes CPU 12 to execute software 13 which prepares system 10 for power removal and prevents power removal until such preparation is complete. The preparation involves saving transaction data to a disk or other permanent storage medium. Were control software 13 to lose control and disregard an authorized power removal request, power off logic 24 provides a "fail-safe" hardware override so that power may be removed.

Referring now to FIG. 2, on/off circuit 16 is shown in more detail. Power on logic 22 includes logic on command circuit 26 which generates hardware command ON when on/off switch 18 is placed in position ON. Logic on command circuit 26 may be any such circuit known in the art. Power on logic 22 also includes control logic 27 which provides control to control software 13 and provides a "fail-safe" hardware function if control software 13 fails.

Control logic 27 primarily includes logic off command circuit 28, one-shot multivibrators 30 and 32, and timer circuit 34 between the output of one-shot multivibrator 30 and the input of one-shot multivibrator 32.

Logic off command circuit 28 generates hardware command OFF when on/off switch 18 is in position OFF, key switch 20 is in authorized position AUTH, and control software 13 is in control of the power off process. Logic off command circuit 28 may be any such circuit known in the art.

One-shot multivibrator 30 receives signal OFF from on/off switch 18 and provides an interrupt request signal IRQ to CPU 12 to begin execution of control software 13. This dedicated interrupt indicates to control software 13 that a request has come from on/off switch 18 to turn off power.

One-shot multivibrator 32 provides output Q, which is directly connected via isolation transistor 35 to logic off command circuit 28, and causes logic off command circuit 28 to generate hardware command OFF to power supply 14. Isolation transistor 35 is preferably a field-effect transistor (FET). When key switch 20 is in position UNAUTH, one-shot multivibrator 32 receives unauthorization signal UNAUTH from key switch 20, which provides reset signal RST for resetting both multivibrators 30 and 32, after being inverted by inverter 33. Reset signal RST resets one-shot multivibrators 30 and 32, thereby preventing one-shot multivibrator 30 from generating interrupt request signal IRQ and one-shot multivibrator 32 from issuing output signal Q to logic off command circuit 28.

Timer circuit 34 includes capacitor 36, resistor 38, and diode 40. Timer circuit 34 times a predetermined amount of time period from the receipt of signal OFF from on/off switch 18. This time period is solely determined by the time constant associated with capacitor 36 and resistor 38. Preferably, the time period is about 350 milliseconds. After the expiration of the time period, timer circuit 34 provides signal FIRE to one-shot multivibrator 32. Diode 40 ensures that the output voltage of timer circuit 34 does not exceed safe limits for the input to one-shot multivibrator 32.

Operation of on/off circuit 16 is straightforward. Switch 18 is placed in the off position to issue signal OFF. If key switch 20 is in position UNAUTH, key switch 20 generates unauthorized signal UNAUTH which resets one-shot multivibrators 30 and 32 with reset signal RST, thereby preventing control software 13 from assuming control and issuing interrupt request IRQ. If key switch 20 is in position AUTH, signal OFF fires one-shot multivibrator 30. One-shot multivibrator 30 issues interrupt request IRQ and charges timer circuit 34.

At this point, there are two possible scenarios: control software 13 has control of system 10 and handles the power off request, or control software 13 has been lost or does not otherwise have control of system 10. That is, if control software 13 does not acknowledge interrupt request IRQ within the predetermined time period, hardware (power off logic 24) regains control of system 10 and issues hardware command OFF to power supply 14.

In the first scenario, control software 13 is given the predetermined amount of time from timer circuit 34 to issue output signal OFF after receiving interrupt request IRQ. Output signal OFF is implemented as a write to a port. Control software 13 performs an orderly shutdown of all of the software services currently running on the computer. Control software 13 then issues output signal OFF to logic off command circuit 28, which issues hardware command OFF to power supply 14.

Under the second scenario, control software 13 fails to acknowledge interrupt request IRQ within the predetermined time period. At this point, control software 13 is not operating properly. As a "fail-safe" measure, control logic circuit 27 regains control over the power off process from control software 13.

The expiration of the predetermined time period, without a software acknowledge sequence, generates signal FIRE which fires one-shot multivibrator 32. Output Q causes logic off command circuit 28 to generate hardware command OFF to power supply 14.

Although the present invention has been described with particular reference to certain preferred embodiments thereof, variations and modifications of the present invention can be effected within the spirit and scope of the following claims.

What is claimed is:

1. An apparatus for disconnecting a power supply from a computer comprising:

a power switch having on and off positions, wherein the power switch is vulnerable to being placed in the off position from the on position by a first person lacking authority to remove power;

a key switch having authorized and unauthorized positions for use by a second person having authority to remove power;

a control circuit which produces first and second signals;

wherein the control circuit produces the first signal only if the power switch is in the off position and the key switch is in the authorized position;

wherein the first signal causes the computer to execute a software program which prepares the computer for power removal by terminating execution of transaction application programs and saving transaction data to a permanent storage medium and which returns a third signal to the circuit when the software program has prepared the computer for power removal; and wherein the control circuit produces the second signal to disconnect the power supply in response to the third signal.

2. The apparatus as recited in claim 1, wherein the control circuit provides the second signal, after a predetermined time from when the control circuit sent the first signal to the software program, to disconnect the power supply if the software program has not already sent the third signal so that the computer may be shut down.

3. The apparatus as recited in claim 1, wherein the first signal comprises a predetermined interrupt request to the computer.

4. The apparatus as recited in claim 1, wherein the power supply comprises a logic on/off power supply, and wherein the second signal comprises a logic off command signal.

5. The apparatus as recited in claim 1, wherein the third signal comprises a write signal to a port of the computer.

6. The apparatus as recited in claim 1, wherein the power supply comprises a logic on/off power supply and wherein the control circuit further comprises:
   a one-shot multivibrator coupled to the computer, the power switch, and the key switch, wherein the key switch produces a reset signal for resetting the one-shot multivibrator when the key switch is in the unauthorized position, wherein the one-shot multivibrator produces the first signal in response to the off signal from the power switch when the key switch is in the authorized position, and wherein the first signal comprises a predetermined interrupt request; and
   a logic off command circuit coupled to the computer which produces the second signal, wherein the second signal comprises a logic off command signal.

7. The apparatus as recited in claim 2, wherein the power supply comprises a logic on/off power supply and wherein the control circuit comprises:
   a first one-shot multivibrator coupled to the computer, wherein the first one-shot multivibrator produces the first signal, and wherein the first signal comprises a predetermined interrupt request;
   a timer circuit coupled to the first signal from the first one-shot multivibrator for timing a predetermined time period from production of the first signal;
   a second one-shot multivibrator coupled to the timer circuit for producing a fourth signal for disconnecting the power supply if the software program does not produce the third signal within the predetermined time period; and
   a logic off command circuit coupled to the computer which produces the second signal in response to either the third signal from the software program or the fourth signal from the second one-shot multivibrator, wherein the second signal comprises a logic off command signal.

8. The apparatus as recited in claim 7, wherein the power switch produces an off signal in the off position and the key switch produces a reset signal for resetting the first and second one-shot multivibrators in the unauthorized position.

9. The apparatus as recited in claim 1, further comprising:
   another control circuit for connecting the power supply to the computer.

10. The apparatus as recited in claim 9, wherein the power supply comprises a logic on/off power supply and the other control circuit comprises:
    a logic on command control circuit coupled between the power switch and the power supply which produces a logic on command signal in response to the on signal from the power switch.

11. A method of disconnecting a power supply from other components within a computer comprising the steps of:
    producing a first signal from a control circuit within the computer only if a key switch, within the computer and having authorized and unauthorized positions, is placed in the authorized position by a first person having authority to remove power and if a power switch, within the computer and having on and off positions and being vulnerable to being placed in the off position by a second person lacking authority to remove power, is in the off position;
    executing a predetermined software program in response to the first signal from the control circuit;
    preparing the computer for power removal by the software program, including the substeps of terminating execution of transaction application programs and saving transaction data to a permanent storage medium;
    returning a second signal to the control circuit by the software program when the computer has been prepared for power removal; and
    producing a third signal by the control circuit to disconnect the power supply.

12. The method as recited in claim 11, further comprising the steps of:
    starting a timer when the first signal is produced by the control circuit;
    timing a predetermined time period for allowing the software program to produce the second signal by the timer; and
    producing the third signal by the control circuit after the predetermined time period if the software program has not already sent the second signal, so that the computer may be shut down.

13. The method as recited in claim 11, wherein the step of producing a first signal comprises the substep of:
    producing an interrupt request to the computer.

14. The method as recited in claim 11, wherein the power supply comprises a logic on/off power supply, and wherein the step of providing a third signal comprises the substep of:
    producing a logic off command signal by the predetermined control circuit.

15. The method as recited in claim 11, wherein the step of returning a second signal comprises the substep of:
    producing a write signal to a port of the computer by the software program.

16. The method as recited in claim 11, further comprising the step of:
    preventing the step of producing the first signal, including the substep of:
    producing a fourth signal by the key switch when the key switch is in the unauthorized position.

17. The method as recited in claim 16, wherein the power supply comprises a logic on/off power supply and wherein the control circuit further comprises:
    a one-shot multivibrator coupled to the computer, the power switch, and the key switch, wherein the fourth signal comprises a reset signal for resetting the one-shot multivibrator when the key switch is in the unauthorized position, wherein the one-shot multivibrator produces the first signal in response to the off signal from the power switch when the key switch is in the authorized position, and wherein the first signal comprises a predetermined interrupt request; and
    a logic off command circuit coupled to the computer which produces the third signal, wherein the third signal comprises a logic off command signal.

18. The method as recited in claim 17, wherein the control circuit further comprises:
    a timer circuit coupled to the first one-shot multivibrator which times the predetermined time period after receiving the first signal; and
    another one-shot multivibrator coupled to the timer circuit and to the logic off command circuit for producing a fifth signal for disconnecting the power supply if the software program does not produce the second signal within the predetermined time period;
    wherein the logic off command circuit produces the third signal in response to either the second signal from the software program or the fifth signal from the other one-shot multivibrator.

19. An apparatus for disconnecting a power supply from a computer comprising:

a control circuit which produces a first signal and a second signal, and which includes a power switch having on and off positions, and a key switch having authorized and unauthorized positions for use by a first person having authority to remove power;

wherein the power switch is vulnerable to being placed in the off position from the on position by a second person lacking authority to remove power;

wherein the control circuit produces the first signal only if the power switch is in the off position and the key switch is in the authorized position;

wherein the first signal causes the computer to execute a software program which prepares the computer for power removal by terminating execution of an application program and saving application data to a permanent storage medium, and which returns a control signal to the circuit when the software program has prepared the computer for power removal;

wherein the control circuit produces the second signal to disconnect the power supply in response to the control signal; and a backup circuit which causes the control circuit to produce the second signal, after a predetermined time from when the control circuit sent the first signal to the software program, to disconnect the power supply if the software program has not already sent the control signal.

20. An apparatus for disconnecting a logic on-off power supply from a computer comprising:

a control circuit which produces an interrupt signal and a logic off command signal, and which includes a power switch having on and off positions, a key switch having authorized and unauthorized positions for use by a first person having authority to remove power;

wherein the power switch is vulnerable to being placed in the off position from the on position by a second person lacking authority to remove power;

wherein the control circuit produces the interrupt signal only if the power switch is in the off position and the key switch is in the authorized position;

wherein the interrupt signal causes the computer to execute a software program which prepares the computer for power removal by terminating execution of an application program and saving application data to a permanent storage medium, and which returns a control signal to the control circuit when the software program has prepared the computer for power removal;

wherein the control circuit produces the logic off command signal to disconnect the power supply in response to the control signal; and a backup circuit which produces the control signal to cause the control circuit to produce the logic off command signal, after a predetermined time from when the control circuit sent the interrupt signal to the software program, to disconnect the power supply if the software program has not already sent the control signal.

21. A method of disconnecting a power supply from a computer comprising the steps of:

providing a first switch having an on position and an off position, wherein the first switch is vulnerable to being placed in the off position from the on position by a first person lacking authority to remove power;

providing a second switch for use by a second person having authority to remove power;

sensing that the first switch is in the off position indicating that power should be removed from the computer;

sensing that the second switch is also in an off position indicating that power should be removed from the computer;

producing a first signal from a control circuit within the computer in response to sensing both the first and second switches being in the off positions;

initiating execution of a predetermined software program in response to the first signal from the control circuit;

if the software program functions, preparing the computer for power removal by the software program, producing a second signal by the software program, and returning the second signal to the control circuit by the software program when the computer has been prepared for power removal;

if the software program malfunctions, producing the second signal by a backup circuit and providing the second signal to the control circuit by the backup circuit; and producing a third signal by the control circuit in response to receiving the second signal from either the software program or the backup circuit to disconnect the power supply.

22. A method of disconnecting a logic on-off power supply from a computer comprising the steps of:

providing an on-off switch having an on position and an off position, wherein the on-off switch is vulnerable to being placed in the off position from the on position by a first person lacking authority to remove power;

providing a key switch for use by a second person having authority to remove power;

sensing that the on-off switch is in the off position indicating that power should be removed from the computer;

sensing that the key switch is also in an off position indicating that power should be removed from the computer;

producing an interrupt signal from a control circuit within the computer in response to sensing both the on-off and key switches in the off positions;

initiating execution of a predetermined software program in response to the interrupt signal from the control circuit;

if the software program functions, preparing the computer for power removal by the software program by terminating execution of an application program, saving application data to a permanent storage medium, and producing a control signal by the software program and returning the control signal to the control circuit by the software program when the computer has been prepared for power removal;

if the software program malfunctions, producing the control signal by a backup circuit and providing the control signal to the control circuit by the backup circuit; and producing a logic off command signal by the control circuit in response to receiving the control signal from either the software program or the backup circuit to disconnect the power supply.

23. An apparatus for disconnecting a power supply from a point-of-service computer comprising:

a first switch having on and off positions for removing power from the point-of-service computer, wherein the first switch is vulnerable to being placed in the off position from the on position by a first person lacking authority to remove power from the point-of-service computer;

a second switch having authorized and unauthorized positions and controlled by a second person having authority to remove power from the point-of-service computer;

a control circuit which produces first and second signals;

wherein the control circuit produces the first signal only if the first switch is in the off position and the second switch is placed in the authorized position by the person having authority;

wherein the first signal causes the computer to execute a software program which prepares the computer for power removal by terminating execution of transaction application programs and saving transaction data to a permanent storage medium and which returns a third signal to the circuit when the software program has prepared the computer for power removal; and wherein the control circuit produces the second signal to disconnect the power supply in response to the third signal.

24. A method of disconnecting a power supply from a point-of-service computer comprising the steps of:

providing first and second switches for removing power from the point-of-service computer, wherein the first switch is vulnerable to being placed in an first position by a first person lacking authority to remove power from the point-of-service computer, and wherein the second switch is controlled by a person having authority to remove power from the point-of-service computer;

sensing that the first switch is in the first position indicating that power should be removed from the point-of-service computer;

sensing that the second switch has been placed in a first position by the person having authority, indicating that power should be removed from the computer;

producing a first signal from a control circuit within the computer in response to sensing both the first and second switches in the first positions;

initiating execution of a predetermined software program in response to the first signal from the control circuit;

timing a predetermined period since production of the first signal;

producing a second signal by a backup circuit and providing the second signal to the control circuit by the backup circuit if the software program fails to prepare the computer for power removal and fails to return the second signal to the control circuit; and producing the third signal by the control circuit in response to receiving the second signal from either the software program or the backup circuit to disconnect the power supply.

* * * * *